Figure 1:
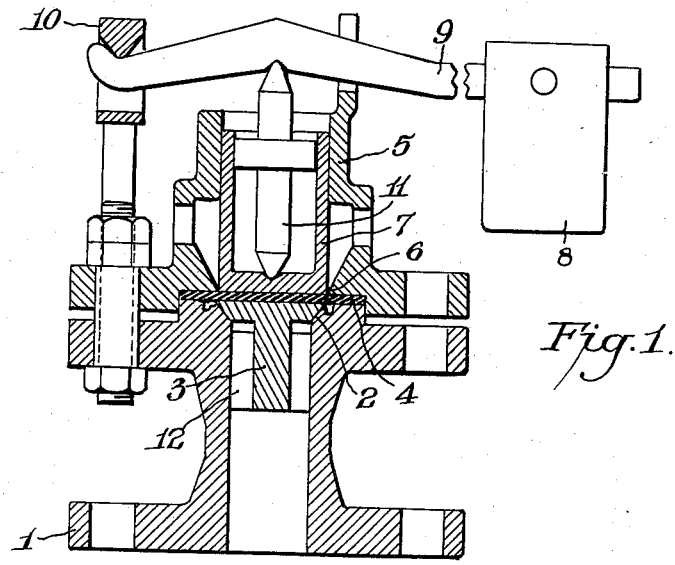

April 12, 1960  K. F. ERB  2,932,308
PRESSURE RELIEF VALVE
Filed March 8, 1954  2 Sheets-Sheet 1

INVENTOR
Karl F. Erb
BY Connolly and Hutz
ATTORNEYS

April 12, 1960  K. F. ERB  2,932,308
PRESSURE RELIEF VALVE
Filed March 8, 1954  2 Sheets-Sheet 2
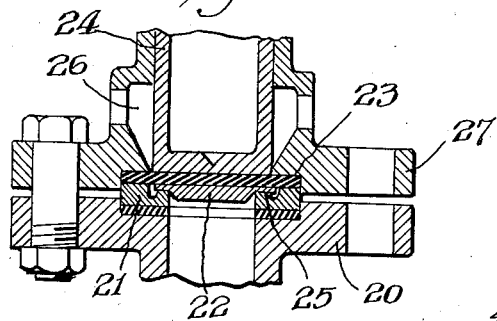
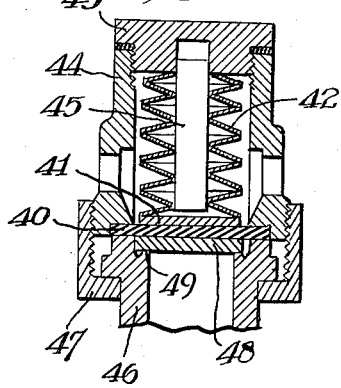
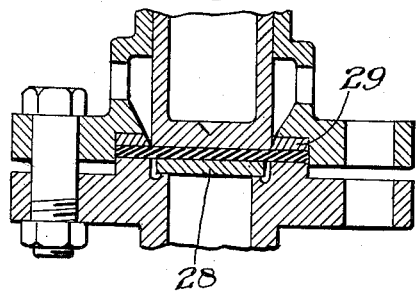
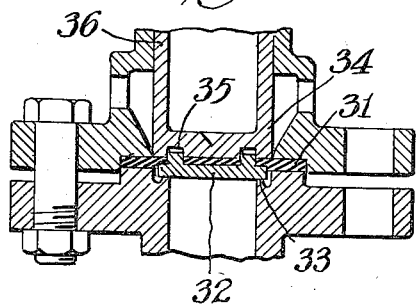
INVENTOR
Karl F. Erb
BY Connolly and Hutz
ATTORNEYS United States Patent Office 2,932,308
Patented Apr. 12, 1960

2,932,308

PRESSURE RELIEF VALVE

Karl F. Erb, Frankfurt am Main, Germany

Application March 8, 1954, Serial No. 414,698

10 Claims. (Cl. 137—70)

The present invention relates to safety devices protecting pressure systems or apparatus, especially vessels, against overpressure and bursting. This application is a continuation-in-part of my prior-filed copending application, Serial Number 151,973, filed March 25, 1950, now abandoned.

Particularly the invention relates to pressure relief valves adapted, for example, to protect apparatus against being subjected to excessive pressure, and more particularly to such a valve adapted to be actuated when a predetermined pressure is reached.

Safety valves usually comprise a movable closure member held in place on a valve seat by a spring or weight. Such known valves, however, do not provide a sufficiently close seal under all conditions, as the effective seating of the movable closure member may be impaired, for instance, by the corrosion of the said member or of the valve seat.

In order to avoid such defects it has been suggested to bridge the slit or the place of abutment between the valve seat and the movable closure member (valve cone) by means of a diaphragm which is destroyed on opening of the valve. In this case, however, it may happen that torn parts of the diaphragm will get between the seat and the cone, thus preventing a satisfactory reclosure of the valve after the pressure has diminished.

According to the present invention this disadvantage is overcome by using a pressure relief valve which comprises (a) a valve casing forming a valve passage, the casing consisting of a lower part connected to a pressure system, and an upper part, the two parts being tightly held together in axial alignment one upon the other, (b) two movable closure members housed within said passage in axial alignment with each other, (c) a valve seat for the lower closure member provided on the lower valve casing part, (d) resilient means urging the upper closure member towards the lower one and the latter towards its seat, (e) a frangible diaphragm placed between the adjacent faces of the two closure members and having its peripheral edge clamped between the adjacent faces of the two valve casing parts which faces are on the same level as the faces of the closure members. The lower part of the upper closure member and its inner face are surrounded and enclosed by a conical annular constriction or tapering of the upper valve casing part and the slit formed between this constriction and the upper closure member is overbridged and sealed by the said diaphragm which may be of varying thickness, e.g. within the range of 0.01 to 0.1 mm., depending on the technical requirements. Sometimes, however, diaphragms of a greater thickness may be employed. Since the valve seat is spaced from the diaphragm in the direction of the pressure vessel, parts of the diaphragm, which may have been torn off on opening of the valve cannot get to the valve seat and the lower closure member may rest again on its seat perfectly, after the pressure has diminished.

The pressure relief valve of the present invention has the further advantage that the slit between the outer face of the lower closure member, which of course is also covered by the diaphragm, and the lower part of the valve casing is also bridged over by the diaphragm, and that in case of a potential subatmospheric pressure or low-pressure in the pressure vessel or system a completely tight seal is provided.

In the accompanying drawings, Figs. 1 to 7 show diagrammatic sections through some embodiments of the pressure relief valve of the present invention, or parts thereof, by means of which the principles of the invention are described in greater detail.

In Fig. 1 member 1 is the lower valve casing part which is connected to a pressure system, for instance the vessel to be safeguarded. This member comprises a valve seat 2, on which rests the lower closure member 3, provided with guide ledges 12. 4 is the diaphragm, the peripheral edge of which is clamped betwen the valve casing parts 1 and 5. The conical annular constriction 6 within the upper casing part 5 surrounds the inner face of the piston-shaped upper closure member 7. The diaphragm 4 bridges the narrow slit between the constriction 6 and the upper closure member 7. A load 8 exerts pressure on said member 7 by means of the lever 9, the countersupport 10 and the pressure rod 11.

Figure 2:
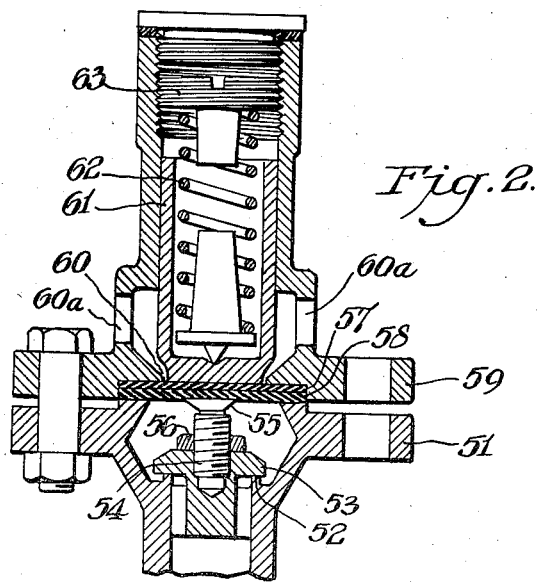

Fig. 2 shows a pressure relief valve differing from the valve described in Fig. 1 by the fact that the face of the lower closure member is adjustable by varying the axial length of the closure member, and that the diaphragm consists of several layers and the load on the upper closure member is exerted by a spring.

As shown in the accompanying drawing a valve casing is provided including a lower part 51 adapted to be connected to a vessel or container for fluid under pressure, and an upper part 59. The lower part 51 houses a movable valve closure member 53 and is formed with a valve seat 52 therefor. The valve closure member 53 carries a plate 55 which may be adjustable by screw threads indicated by 54, a locking nut 56 being provided for securing the plate in adjusted position.

A second movable valve closure member 61 is housed in the upper casing part 59, this member being urged downwardly by a spring 62, the pressure of the spring being adjustable by means of the screw plug 63.

The valve casing parts 51, 59 are hollow and accordingly constitute a valve passage consisting of a lower portion 51ᵃ and an upper portion 60 which are sealed from one another by a frangible diaphragm formed of, for instance, two plies or sheets 57, 58. The peripheral edge of the diaphragm is clamped between the adjacent casing parts 51, 59 and it will be noted that the plate 55 of the valve closure member 53 is in closed abutting contact with the under surface of the diaphragm and the face of the valve closure member 61 abuts the upper surface thereof, the spring 62 serving to maintain these parts in closed contact with the opposite surfaces of the diaphragm.

If the pressure in the vessel or container connected with the lower casing part 51 exceeds a predetermined pressure, the valve closure members 53 and 61 will be lifted. The excess pressure acting on the under surface of the diaphragm 57, 58 will cause the latter to be deflected upwardly to such an extent as to rupture or burst it. The excess pressure is then able to escape past the valve closure members and diaphragm to the passage 60 and exhaust through the outlets 60ᵃ located in the upper casing part 59. When the pressure returns to normal the spring 62 will force the valve closure member 61 downwardly again, and as the valve closure member 53 is in axial alignment therewith it will force the valve closure member 53 onto its seat 52 to reclose the valve. As the valve 53 and seat 52 are spaced from the diaphragm, torn parts depending from the ruptured diaphragm cannot become positioned between the valve and its seat owing to the escaping fluid, and will not therefore interfere with the proper seating of the closure member 53.

It will be understood that the valve closure member 53 will be lifted as described above when there is a relatively sudden rise in pressure. In some cases, however, when the rise in pressure is very gradual, and the valve member 53 is not absolutely fluid tight, it may be possible for fluid to leak past the valve member 53 and cause a slow build up of pressure in the space between the valve member 53 and the underface of the diaphragm. In this case the build up of pressure in said space will eventually lift the valve member 61 and rupture the diaphragm without the valve member 53 being actually lifted off its seat 52.

Fig. 3 shows a pressure relief valve having two closure members, the lower member of which comprising no guide ledges. Only the most important parts of the valve are shown. In the lower casing part 20 a plate 21 is inserted, containing the seat 25 for the lower closure member 22. Between this member and the upper closure member the diaphragm is situated. Reference number 26 designates guide ledges in the upper casing part 27 for guiding the upper closure member 24.

Fig. 4 shows an arrangement, in which the lower closure member merely consists of a plane plate 28, all the other parts being similar to those of the valves described in Fig. 1 to 3. Here, the annular constriction of the housing is provided by an inserted ring 29.

Fig. 5 shows a diaphragm 31 having a reinforced central portion 32 which directly rests on the valve seat 33, so that, here, the central portion of the diaphragm serves as the lower closure member. An annular guide flange 34 on the central portion is received in a recess 35 of the upper closure member 36.

Fig. 6 shows a reinforced diaphragm, having no annular guide flange.

Fig. 7 shows a pressure relief valve, containing a plate 41 instead of the piston-shaped upper closure member. The plate is loaded by springs 42, which are held under pressure by the bolt 43 and are guided by the casing part 44 and part 45. The diaphragm is clamped between the casing parts 44 and 46 by means of the cap nut 47. By way of the diaphragm 40 plate 41 presses plate 48 on its seat 49.

The diaphragm may comprise relatively thin sheets of metal, plastic material, rubber or paper, of e.g. 0.01 to 0.1 mm. thickness, or may be formed by a film of material such as collodion wav. To avoid corrosion the diaphragm may comprise several layers, for example, a sheet of metal foil and a sheet of plastic material and, if desired, the surface of the sheets may be provided with a protective coating of suitable material. The diaphragm may be secured to at least one of the abutting parts for instance one of the parts 51, 55, 59, 61 of Fig. 2 by adhesive or in the case of metal sheets by soldering.

The diaphragm may be adapted to be ruptured in response to a pressure which is some tenths, for example two tenths, above the maximum allowable working pressure of the fluid acting on the valve.

It will be understood that various modifications of my invention described above may be made without departing from the spirit and scope of my invention which modifications I intend to cover by the appended claims.

I claim:
1. A sealed pressure relief valve comprising a valve housing, axially aligned inlet and outlet passages in said valve housing, the inlet passage being unbranched, a valve seat in the inlet passage and facing the outlet passage, a valve head axially movable toward and away from said seat to close off the inlet passage when against said seat, a peripheral ledge at the inner end of said inlet passage, a peripheral ledge on the inner end of said outlet passage, a generally flat imperforate frangible diaphragm seal positioned between the peripheral ledges on the inlet and outlet passages and sealing the inlet passage against leakage of the valve, said diaphragm seal overlying the inner end of said valve head, a plunger in said outlet passage biased against said diaphragm seal and said valve head, to keep the valve head pressed against its seat except when the pressure on the inlet passage exceeds a predetermined maximum, guide structure cooperating with the plunger to guide it outwardly when said pressure reaches that predetermined maximum so that the diaphragm seal is broken by the conjoint action of the head and plunger as they move outwardly under that predetermined maximum pressure, and the plunger occupying substantially the entire space within the peripheral ledge of the outlet chamber to hold the broken diaphragm against the valve head and keep it from interfering with subsequent closure of the valve when the pressure in the inlet passage drops.

2. The valve of claim 1 wherein the plunger bias is a weight biased lever.
3. The valve of claim 1 wherein the plunger bias is a spring.
4. The valve of claim 1 wherein said diaphragm structure is axially spaced from said valve seat.
5. The valve of claim 1 wherein said valve head is axially adjustable in length.
6. The valve of claim 1 wherein said diaphragm structure is connected as part of said valve head.
7. The valve of claim 1 wherein said plunger is an imperforate cylinder.
8. The valve of claim 1 wherein said plunger is a generally flat plate.
9. The valve of claim 1 wherein said valve head is a generally flat plate.
10. The valve of claim 1 wherein said diaphragm structure comprises a plurality of generally flat plates superimposed upon one another.

References Cited in the file of this patent
UNITED STATES PATENTS

| | | |
|---|---|---|
| 1,248,578 | Vuilleumier | Dec. 4, 1917 |
| 1,342,667 | Dougherty et al. | June 8, 1920 |
| 1,665,391 | Willoughby | Apr. 10, 1928 |
| 2,047,750 | Smith | July 14, 1936 |
| 2,320,339 | Buttner | June 1, 1943 |
| 2,353,093 | Tryon | July 4, 1944 |
| 2,405,439 | Lubbock | Aug. 6, 1946 |
| 2,426,808 | Auer | Sept. 2, 1947 |